United States Patent Office 2,834,561
Patented May 13, 1958

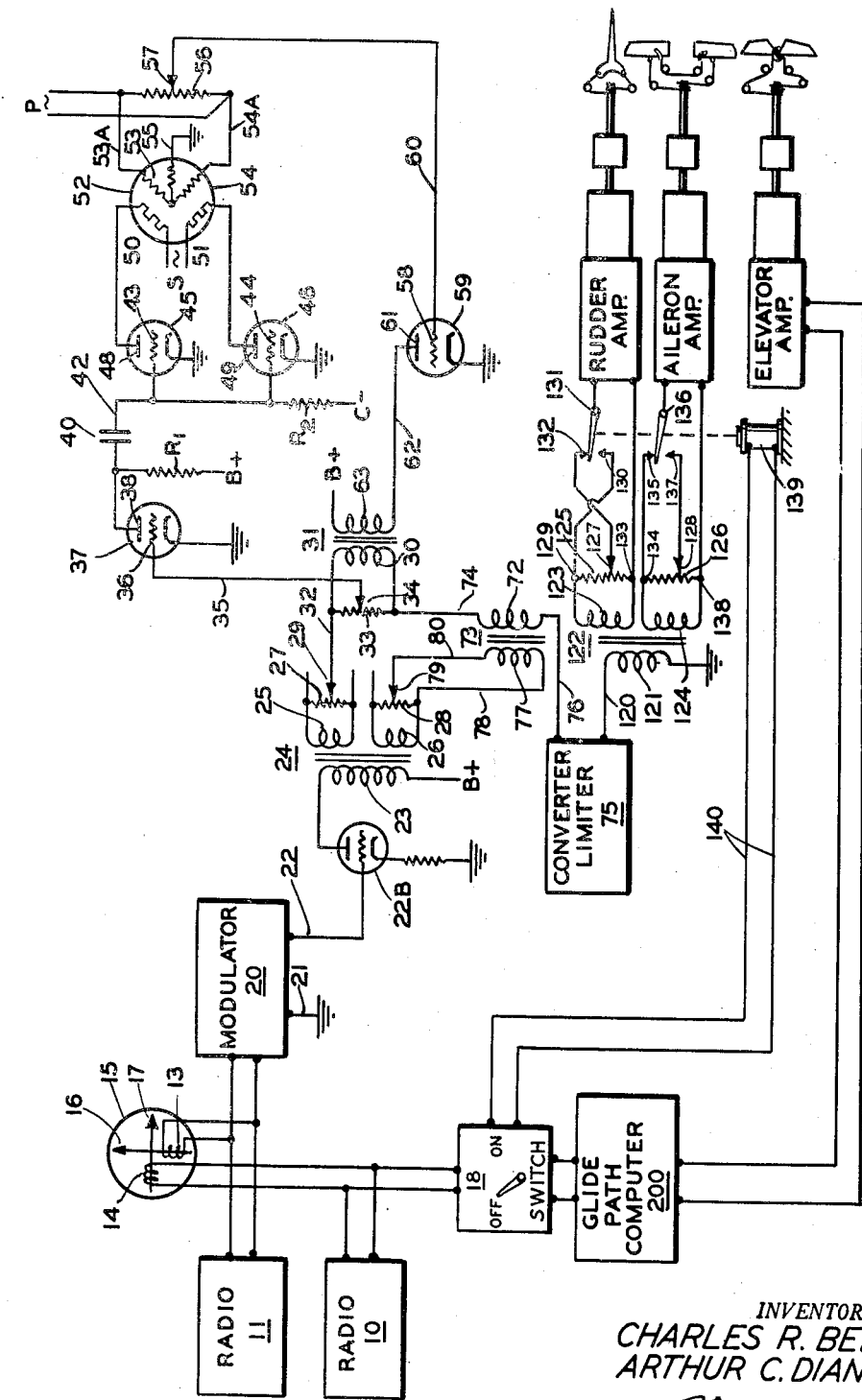

2,834,561

SYSTEM FOR CHANGING THE COORDINATION OF CRAFT CONTROL SURFACES

Charles R. Bell, Bergenfield, and Arthur C. Diani, Clifton, N. J., assignors to Bendix Aviation Corporation, Teterboro, N. J., a corporation of Delaware Application March 22, 1952, Serial No. 278,022

10 Claims. (Cl. 244—77)

This invention relates to the control of aircraft or other mobile craft toward a selected objective and more particularly to the control of the craft as it approaches the objective.

The automatic pilot systems of the heretofore known type effect directional control of the craft through the control of the aileron and rudder surface displacements. Under cruising conditions directional control of the aircraft may be maintained primarily by aileron displacement. Thus, rolling the aircraft by means of its aileron surfaces produces a change in the craft's heading. Under landing conditions, however, different problems are presented. The flying speed is reduced, the flaps are lowered, and the relationship between the bank angle of the craft and the change in heading effected by this bank angle is altered. As a result of these factors, a greater degree of bank is required to effect the desired change in heading under landing conditions than is required under cruising conditions.

Banking the aircraft at low altitudes is hazardous. Such banking may result in a wing's dragging or digging into the ground, particularly since a period of time is required to raise and lower the wings of large aircraft. Furthermore, grave psychological reactions are aroused in the passengers when they see a wing dip towards the ground while the aircraft is at low altitude.

The human pilot, when manually controlling the landing of the aircraft, generally uses the rudder for directional control or change in heading and uses the ailerons only to maintain coordination. Thus, when he makes any turn for a change in heading when the craft is close to the ground during a landing operation, he executes a flat turn keeping the wings nearly level with the horizon.

An object of the present invention, therefore, is to provide a novel means to reduce the hazards incident to the instrument landing of aircraft.

Another object of the invention is to provide a novel means to increase the landing safety of aircraft by decreasing the tendency of the aircraft to bank or roll as it nears the landing strip.

A further object is to provide a means for selecting one of several coordination patterns for the control surface of aircraft.

A still further object is to provide a novel automatic steering system for aircraft or other mobile vehicles wherein as the aircraft approaches its destination the effectiveness of at least some of its control surfaces will be altered.

Another object is to provide a novel control system adapted to decrease the control influence exerted by one surface of an aircraft or other mobile vehicle and increase the influence of the other surface particularly as the aircraft or other body approaches its objective.

Another object is to provide a novel control to adjust the proportion of rudder control to aileron control used by the aircraft during cruising conditions and an independent adjustment to change the proportions for landing operations.

The above and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description only, and is not designed as a definition of the limits of the invention.

The single figure of the drawing constitutes a schematic diagram of the novel landing control of the present invention in combination with an automatic pilot system.

The novel landing control is disclosed in connection with an automatic pilot for receiving directions from conventional localizer and glide path transmitters located at ground stations. It is obvious, though, that the present invention may be used with other types of directing means such as, for example, compasses, gyros, lights, etc., and is not limited to the particular automatic pilot system shown.

The novel landing control is illustrated herein in connection with an automatic pilot of the type described in copending application Serial No. 705,524, filed October 25, 1946, by Paul A. Noxon et al., and now U. S. Patent No. 2,592,173, issued April 8, 1952, and assigned to the assignee of this application.

Referring now to the drawing, a radio 10 receives glide path beam transmissions from a transmitting station on the ground at the landing strip. A radio 11, similarly, receives transmissions from a localizer transmitter at the ground station. Each radio sends to the respective coil 13 or 14 to which it is connected a D. C. current, representing deviation from the respective beam. These coils regulate the position in indicator 15 of the cross pointers 16 and 17 which give the human pilot visual evidence of the craft's deviation from the localizer and glide path beams.

Radio 10, receiving the glide path transmissions, is also connected through a suitable switch 18 to a glide path computer 200. When engaged, computer 200 controls the pitch attitude of the aircraft through the amplifier and servomotor for the elevator surfaces to cause the aircraft to attain and follow automatically the glide path beam. One computer of such type is described in copending application Serial No. 202,552, filed December 22, 1950, by Paul A. Noxon et al., and assigned to the assignee of the present invention.

Radio 11, which receives the localizer or range transmissions, is connected with a modulator 20. This modulator changes the relatively weak D. C. signal received from radio 11 into a workable A. C. signal of varying phase and amplitude. A detailed description of a modulator of one type is found in copending application Serial No. 700,234, filed September 30, 1946, by Alfred Bennett, and now U. S. Patent No. 2,678,919, issued May 11, 1954, and assigned to the assignee of this application.

One output lead 21 of modulator 20 is grounded. The other output lead 22 of modulator 20 is connected for communicating the signal therefrom through an amplifier 22B and the primary winding 23 of a transformer 24. Primary winding 23, in turn, is connected to a suitable source of D. C. current B+ for a plate supply for amplifier 22B.

Transformer 24 is the input to a rate deriving or damping circuit which is fully described in copending application Serial No. 90,236, filed April 28, 1949, by Alfred Bennett et al., and now U. S. Patent No. 2,754,418, issued July 10, 1956, and assigned to the assignee of this application.

The signal on the primary winding 23 of transformer 24 induces a signal on the two secondary windings 25 and 26. The signal from winding 25 goes through a rate deriving circuit. The signal from winding 26, on the other hand, serves as the displacement signal and goes to the control surface servomotors.

The signal for the damping circuit is taken from the tap 29 of the resistor 27 across winding 25 of transformer 24 and is communicated to the winding 30 of a feedback transformer 31 by way of a lead 32. The signal taken from tap 34 of a variable tapped resistor 33 across winding 30 is conducted by a lead 35 to the grid 36 of an amplifier tube 37. The amplified signal from the plate 38 of amplifier 37 is conducted through a condenser 40 by lead 42 to the grids 43 and 44 of a pair of discriminator tubes 45 and 46. A plate supply for plate 38 is provided through resistor $R_1$ by a suitable source of D. C. current B+. A grid supply source for grids 43 and 44 is obtained through resistor $R_2$ from a suitable D. C. source C—.

Plates 48 and 49 of discriminators 45 and 46 are connected for conducting the signal to the heater elements 50 and 51 of a glass-enclosed thermal time delay tube 52. The delay tube 52 in this embodiment is of the type described in U. S. Patent No. 2,463,805, issued March 18, 1949, to Polye et al. Also connected to the heater elements 50 and 51 is a suitable A. C. power source S in phase with the A. C. power source (not shown) to modulator 20.

In heat exchange relationship with heater elements 50 and 51 are the resistors 53 and 54 which are joined together inside the tube. Connected across the external leads 53A and 54A of resistors 53 and 54 is a variable-tapped resistor 56. Connected to the junctions of resistor 56 and leads 53A and 54A is a suitable power source P of a phase to give a signal in phase opposition to the phase of the signal appearing at winding 23 of transformer 24.

It will now be apparent that in connection with the thermal delay device 52, a normally balanced Wheatstone bridge is presented which consists of four diagonals: one diagonal being resistor 53 and lead 53A; another being resistor 54 and lead 54A; a third, the portion of resistor 56 between tap 57 and the junction of itself with 53A; and a fourth, the portion of resistor 56 between tap 57 and its junction with lead 54A. The input power supply to the bridge is P. The output of the bridge is defined by a grounded lead 55 and a tap 57 connected to a grid 58 of an amplifier tube 59 by a lead 60.

When either resistor 53 or 54 becomes heated to a varying degree because of its heat exchange relationship with heater 50 or 51 which has become heated due to the signal thereon, the bridge is unbalanced. The voltage potential that develops is taken from tap 57 and is impressed by way of a lead 60 on the grid 58 of tube 59. Plate 61 of amplifier 59 is connected by lead 62 to the winding 63 of transformer 31 and thence to a suitable plate supply, such as the D. C. source B+. The amplified potential from plate 61 impressed on winding 63 induces a potential on winding 30. The signal on winding 30 of transformer 31 is conducted to one end of the winding 72 of a mixing transformer 73 by a lead 74; the other end of winding 72 is connected to a converter limiter 75 for conducting the signal thereto by way of a lead 76. One end of another winding 77 of mixing transformer 73 is connected to secondary winding 26 by lead 78 whereas the other end is connected to the variable tap 79 of the resistor 28 across winding 26 by a lead 80. The signal from the rate deriving circuit and the signal directly from the sensor is thus mixed at transformer 72.

The converter limiter 75 acts as a safety device by limiting the maximum signal level that can be passed through it to the aileron and rudder controls. It also acts to take out much of the undesirable spurious component that usually appears in the signal. This device has been fully explained in copending application Serial No. 117,476, filed September 23, 1949, by Frank Prapis and has now become abandoned, and assigned to the assignee of the present application. Accordingly, the details thereof are not included in this specification.

The signal output of the converter limiter 75 is communicated through a conductor 120 to the primary winding 121 of a transformer 122. The two secondary windings 123 and 124 of transformer 122 have variable-tapped resistors 125 and 126 connected across them. Winding 123 carries the signal for the rudder. Winding 124 carries the signal for the ailerons. One end 129 of secondary winding 123 is attached to one contact 130 of a conventional type relay having a switch arm 131. The other end 133 of secondary winding 123 as well as switch arm 131 is attached to the rudder channel controls. One end 134 of secondary winding 124 is attached to contact 135 of a relay having a switch arm 136 and a contact 137. Contact 137 is attached to the tap 128 of resistor 126. The other end 138 of secondary winding 124 and the relay arm 136 are attached to the aileron channel controls.

Relay arms 131 and 136 are actuated by a solenoid 139 connected by leads 140 to the selector switch 18 for the glide path controller 200. Normally relay arm 131 contacts terminal 132 while arm 136 contacts terminal 135. (The normal position may be maintained by a spring or other means not shown.)

When the glide path computer 200 is engaged solenoid 139 is energized. As a result, arm 131 disengages from its terminal 132 and engages with its terminal 130; arm 136 also disengages from its terminal 135 and engages with its terminal 137. It is obvious that, while an electric relay means has been disclosed to operate arms 131 and 136, numerous other mechanical movements may be employed, as for example, a link arrangement connected for movement with the selector switch.

In the operation of the automatic pilot, using the localizer beam transmission as an example, radio 11 receives a signal in accordance with the lateral displacement of the craft horizontally from the beam. Radio 11 then generates a D. C. signal which is sent to the indicator 15 for the visual benefit of the human pilot and which is also sent to the modulator 20. Modulator 20 then generates an A. C. signal of varying phase and amplitude in accordance with the D. C. signal received and impresses the signal on primary winding 23 of transformer 24.

The signal induced in secondary winding 26 is communicated by lead 78 through transformer 73, by lead 76 to converter limiter 75, then, by lead 120 to transformer 122 where it is impressed on the secondary winding 123 and 124 of the latter transformer for the ultimate actuation of the rudder and aileron controls.

The signal induced on secondary winding 25, on the other hand, is conducted through tap 29 to winding 30 of transformer 31 and resistance 33 to form a damping signal as is explained in greater detail in the aforesaid copending application Serial No. 90,236, now U. S. Patent No. 2,754,418. This damping action steadies the craft on course, for example, by reducing any overrunning of the beam when a correction is made for displacement from the beam.

Briefly, the signal from tap 34 is amplified by tube 37 and impressed on either discriminator tube 45 or 46 depending upon the phase of the signal. This results in one of the heater elements 50 or 51 heating up more than the other and the consequent unbalance in the heating of resistor 53 or 54 in heat exchange relationship therewith. The Wheatstone bridge formed by these resistors is unbalanced due to the change in resistance as one of the resistors becomes heated. Consequently, a signal appears at tap 57 which is conducted to tube 59 where it is amplified and then impressed on secondary winding 63 of transformer 31.

The signal from the rate circuit impressed on the one winding 63 of transformer 31 is of a phase in opposition to the displacement signal from modulator 20 impressed through transformer 24 onto secondary winding 25 and, thence, onto the other winding 30 of transformer 31. The net effect is that, when the signal from modulator 20 is steady, the signal appearing on winding 30 is washed out by the signal appearing on winding 63. When the signal on winding 30 is rising in strength, it is greater than the signal on winding 63. Conversely, when the signal on winding 30 is decreasing in strength, the signal on winding 63 is of greater strength. The resultant of these signals, representing the rate of signal change, is added to the signal, representing craft displacement from the beam, which is induced by winding 77 on winding 72 of mixing transformer 73. Winding 77, it will be remembered, receives its signal from secondary winding 26 of transformer 24. The resultant of the rate and displacement signals is communicated through conductor 76 to converter limiter 75, then finally to the channel amplifiers to actuate the aileron and rudder surfaces.

In normal range flying or cruising conditions, large aircraft are controlled preferably in direction mainly by the ailerons alone and only to a limited extent by rudder. Thus, for normal flying, the aileron channel receives full control signal from end 138 and end 134 of secondary winding 124 through contact 135. The rudder channel, however, receives only a limited signal from end 133 of secondary winding 123 and from contact 132 connected to tap 127 of the resistor 125 for reducing the signal to the desired extent.

As the aircraft intercepts the glide path beam, the human pilot moves the selector switch 18, thereby engaging the glide path computer 200 and, preferably, simultaneously actuating the solenoid relay 139. Relay arms 131 and 136 break with terminals 132 and 135 and engage with terminals 130 and 137. Thus, the signal to the aileron channels is reduced to the desired extent by the tap 128 of variable resistor 126, whereas a full signal is sent from end 129 and end 133 of secondary winding 123 to the rudder control.

The novel arrangement of the present invention allows the aircraft to be controlled during normal cruising or range flying conditions, as is highly desirable, to a great extent by the aileron surfaces and to be controlled only to a limited extent by rudder. Then under landing conditions the aircraft is controlled to only a limited extent by aileron controls and to a great extent by rudder. Thus, for deviations from a desired course, the aircraft executes smoothly banked turns in normal flying and flat turns with horizontally leveled wings in landing operations. By further moving variable taps 127 and 128, the coordination pattern of the rudder and aileron control may be changed for either landing or cruising conditions.

Although only one embodiment of the invention has been illustrated and described in detail, various changes and modifications in the form and relative arrangement of parts, which will now appear to those skilled in the art, may be made without departing from the scope of the invention.

What is claimed is:

1. In an aircraft capable of being in a cruising condition and a landing condition and having thereon aileron and rudder controls and a receiver for receiving guidance from a remote transmitting station, signal means operatively connected to said receiver and responsive thereto for developing a control signal, connecting means connecting said signal means to said controls for the energization of said controls by said control signal, said connecting means having first and second conditions wherein the ratio of the proportion of signal applied to energize said aileron control to the proportion applied to energize said rudder control has a preset value higher for the first condition than for the second condition, and means for changing said connecting means from said first condition for a cruising condition of the craft to said second condition for a landing condition of the craft.

2. A regulator for an automatic pilot system which by way of signals controls the aileron and rudder surfaces of an aircraft, comprising first means operatively connected to said automatic pilot system for regulating the signal ratio between the aileron and the rudder surfaces for the aircraft so as to control the craft mainly by the aileron surface while the craft is cruising, second means operatively connected to said automatic pilot system for regulating the signal ratio between the aileron and the rudder surfaces so as to control the craft mainly by the rudder while the craft is landing, and selecting means operatively connected with said first and second means for selecting one of said means.

3. A regulator for the rudder and aileron surface action of an aircraft which is piloted by signals to said surfaces supplied from a remotely controlled automatic pilot, comprising first means connected with said automatic pilot for reducing the signal to the rudder, second means connected with said automatic pilot system for reducing the signal to the aileron, and means connected with said first and second means for selecting one of said reduction means whereby the amount of rudder action may be reduced when the airplane is cruising to allow control to be mainly by aileron whereas the amount of aileron action may be reduced to allow control to be mainly by rudder for landing operations.

4. In steering apparatus for an aircraft having an automatic pilot responsive to remotely located guide means for maintaining the aircraft on a predetermined course by displacement of the control surfaces by servomotors for controlling the aircraft about two axes thereof, first means connected with said servomotors providing one ratio of displacement of said two surfaces, second means connected with said servomotors providing a second ratio of displacement of said surfaces, and means connected with said first and second means for switching from one ratio to the other.

5. In an aircraft having control surfaces displaceable with respect to said aircraft to control the angular position of said aircraft with respect to two of its control axes, reference means for developing signals for the movement of said surfaces to maintain said craft on a predetermined course, and means operatively connecting said reference means and said surfaces including a means to establish one displacement ratio between said surfaces for the control about said two axes in response to said signals, a means to establish a different displacement ratio between said surfaces in response to said signals, and a means to shift from one displacement ratio to another.

6. In steering apparatus for an aircraft having control surfaces movable with respect to said aircraft for controlling the angular position of said aircraft with respect to three axes thereof, servomotors connected to each of said surfaces, reference means for developing a signal for the operation of two of said surfaces by said servomotors to maintain said craft on a predetermined course, means connecting said reference means and two of said servomotors including a resistance means for reducing the movement of one of said surfaces by a first one of said servomotors in response to said signal, a resistance means for reducing the movement of another of said surfaces by a second one of said servomotors in response to said signal, means for developing signals for the operation of a third one of said servomotors to maintain said craft on a vertical flight path and a means connected with said last-named means and said resistance means for inserting a selected one of said resistance means into said steering apparatus.

7. In steering apparatus for an aircraft having rudder and aileron control surfaces, servomotors connected to said surfaces, reference means for developing a signal for the control of said servomotors to maintain said craft on a predetermined course, connecting means for connecting said servomotors and said reference means including a resistance means for reducing the control of said rudder servomotor in response to said signal and a resistance means for reducing the control of said aileron servomotor in response to said signal, and a relay means operatively connected with said connecting means for inserting a selected one of said resistances into the control system whereby, for cruising, the aircraft may be controlled by aileron, while control by rudder is resisted and, for landing, the aircraft may be controlled by rudder while control by aileron is resisted.

8. An automatic steering system for the instrument landing of an aircraft by action on its aileron, rudder and elevator surfaces, comprising an actuator for each of said surfaces, reference means responsive to a radiant energy guide beam for developing a control effect to operate the aileron and rudder surface actuators so as to maintain the craft on a predetermined horizontal flight path, relay means operatively connecting said reference means with said aileron and rudder surface actuators, said relay means having a cruising position and a landing position for proportioning the control effect to the rudder and aileron actuators whereby said reference means maintain said craft on said horizontal flight path predominately by action on the aileron surface when the aircraft is flying normally and predominately by action on the rudder when the aircraft is preparing to land, means responsive to a radiant energy guide beam for maintaining a craft on a predetermined vertical flight path by action on the elevators, and means connected with said last-named means for placing said last-named means into operation and including means for changing said relay means from a cruising position to a landing position.

9. An automatic steering system for an aircraft comprising a first servomotor adapted to move the rudder of the aircraft, a second servomotor adapted to move the aileron of the aircraft, reference means responsive to deviation of the craft from a predetermined flight path for developing a signal having a corresponding value, and means interconnecting said reference means and said servomotors for operating the latter from said signal including first means for reducing only the signal value to said first servomotor, and second means for reducing only the signal value to said second servomotor, and means for operating a selected one of said first and second means.

10. In an instrument landing system for an aircraft, reference means responsive to a first radiant energy guide beam for developing a control effect to actuate the aileron and rudder surfaces of said craft so as to maintain the craft on a predetermined horizontal flight path, means transmitting said control effect to said aileron and rudder surfaces including relay means having a cruising position and a landing position for changing the ratio of control effect between the rudder and aileron whereby said reference means maintains said craft on said horizontal flight path predominately by action on the aileron for a cruising condition and predominately by action on the rudder for a landing condition, further means responsive to a second radiant energy guide beam for maintaining the craft on a predetermined vertical path by action on the elevator, and means connected with said last named means and said relay means for placing said last named means into operation and simultaneously changing said relay means from a cruising position to a landing position.

References Cited in the file of this patent

UNITED STATES PATENTS

| | | |
|---|---|---|
| 2,575,890 | Perkins et al. | Nov. 20, 1951 |
| 2,655,327 | McGoldrick | Oct. 13, 1953 |
| 2,670,454 | Wilson | Feb. 23, 1954 |
| 2,674,711 | McCallum | Apr. 6, 1954 |